(12) United States Patent
Nadathur et al.

(10) Patent No.: US 7,827,366 B1
(45) Date of Patent: Nov. 2, 2010

(54) METHOD AND SYSTEM FOR PROVIDING CONTINUOUS AND LONG-TERM DATA PROTECTION FOR A DATASET IN A STORAGE SYSTEM

(75) Inventors: Gokul Nadathur, Fremont, CA (US); Andrew C. Meyer, Santa Cruz, CA (US); Mike Szelong, Cupertino, CA (US); Aseem Vaid, Santa Clara, CA (US)

(73) Assignee: Network Appliance, Inc., Sunnyvale, CA (US)

(*) Notice: Subject to any disclaimer, the term of this patent is extended or adjusted under 35 U.S.C. 154(b) by 433 days.

(21) Appl. No.: 11/591,022

(22) Filed: Oct. 31, 2006

(51) Int. Cl.
*G06F 12/16* (2006.01)
(52) U.S. Cl. .......................... 711/162; 711/161; 714/5; 714/6
(58) Field of Classification Search ................. 711/161, 711/162; 714/5, 6
See application file for complete search history.

(56) References Cited

U.S. PATENT DOCUMENTS

| | | | |
|---|---|---|---|
| 5,819,292 A | 10/1998 | Hitz et al. | |
| 6,799,189 B2* | 9/2004 | Huxoll | 707/204 |
| 2003/0033320 A1* | 2/2003 | Houldsworth | 707/103 R |
| 2003/0182325 A1 | 9/2003 | Manley et al. | |
| 2003/0212865 A1* | 11/2003 | Hicken et al. | 711/135 |
| 2007/0028139 A1* | 2/2007 | Wahl et al. | 714/6 |

* cited by examiner

*Primary Examiner*—Sanjiv Shah
*Assistant Examiner*—Jae U Yu
(74) *Attorney, Agent, or Firm*—Blakely, Sokoloff, Taylor & Zafman LLP (57) ABSTRACT

A system, a method, and a computer program product for providing continuous data protection and long-term data protection of data in a storage system. A persistent point-in-time Image (PPI) image of the data is created and stored at a first storage. The data at the first storage is updated frequently to provide continuous data protection. A copy of the dataset is created and stored in a secondary storage. The copy of the dataset stored in a secondary storage is updated and backed up less frequently than the PPIs image of data stored at the first storage to ensure long-term data protection.

29 Claims, 7 Drawing Sheets

METHOD AND SYSTEM FOR PROVIDING CONTINUOUS AND LONG-TERM DATA PROTECTION FOR A DATASET IN A STORAGE SYSTEM

FIELD OF THE INVENTION

At least one embodiment of the present invention pertains to network storage systems, and more particularly, to providing data protection for a network storage system.

BACKGROUND

Various forms of network-based storage systems are known today. These forms include network attached storage (NAS), storage area networks (SANs), and others. Network storage systems are commonly used for a variety of purposes, such as providing multiple users with access to shared data, backing up critical data (e.g., by data mirroring), etc.

A network-based storage system typically includes at least one storage server, which is a processing system configured to store and retrieve data on behalf of one or more client processing systems ("clients"). In the context of NAS, a storage server may be a file server, which is sometimes called a "filer". A filer operates on behalf of one or more clients to store and manage shared files. The files may be stored in a storage subsystem that includes one or more arrays of mass storage devices, such as magnetic or optical disks or tapes, by using RAID (Redundant Array of Inexpensive Disks). Hence, the mass storage devices in each array may be organized into one or more separate RAID groups.

In a SAN context, a storage server provides clients with block-level access to stored data, rather than file-level access. Some storage servers are capable of providing clients with both file-level access and block-level access, such as certain Filers made by Network Appliance, Inc. (NetApp®) of Sunnyvale, Calif.

In file servers, data is stored in logical containers called volumes, which may be identical with, or subsets of, aggregates. An "aggregate" is a logical container for a pool of storage, combining one or more physical mass storage devices (e.g., disks) or parts thereof into a single logical storage object, which contains or provides storage for one or more other logical datasets at a higher level of abstraction (e.g., volumes). A "volume" is a set of stored data associated with a collection of mass storage devices, such as disks, which obtains its storage from (i.e., is contained within, and may be coextensive with) an aggregate, and which is managed as an independent administrative unit, such as a complete file system. A "file system" is an independently managed, self-contained, hierarchal set of data units (e.g., files, blocks or LUNs). Although a volume or file system (as those terms are used herein) may store data in the form of files, that is not necessarily the case. That is, a volume or file system may store data in the form of other units, such as blocks or LUNs.

One feature, which is useful to have in a storage server is the ability to create a read-only, persistent, point-in-time image (RPPI) of a dataset, such as a volume or a LUN, including its metadata. This capability allows the exact state of the dataset to be restored from the RPPI in the event of, for example, data corruption or accidental data deletion. The ability to restore data from an RPPI provides administrators with a simple mechanism to revert the state of their data to a known previous point in time as captured by the RPPI. Typically, creation of an RPPI or restoration from an RPPI can be controlled from a client-side software tool. An example of an implementation of an RPPI is a Snapshot™ generated by SnapDrive™ or SnapManager® for Microsoft® Exchange software, both made by Network Appliance, Inc. of Sunnyvale, Calif. Unlike other RPPI implementations, NetApp Snapshots do not require duplication of data blocks in the active file system, because a Snapshot can include pointers to data blocks in the active file system for any blocks that have not been modified since the Snapshot was created. The term "Snapshot" is used in this document without derogation of Network Appliance, Inc.'s trademark rights. The "active" file system is a file system to which data can be both written and read. RPPI, in contrast, is a read-only copy of the file system saved at a specific time.

An example of an RPPI technique, which does not require duplication of data blocks to create an RPPI, is described in U.S. Pat. No. 5,819,292, which is incorporated herein by reference and which is assigned to Network Appliance, Inc. of Sunnyvale, Calif. In addition, this technique allows an RPPI to be created quickly, helps to reduce consumption of storage space due to RPPIs, and reduces the need to repeatedly update data block pointers as required in some prior art RPPI techniques.

In order to improve reliability and facilitate disaster recovery in the event of a failure of a storage server, its associated disks or some portion of the storage infrastructure, it is common to "mirror" or replicate some or all of the underlying data and/or the file system that organizes the data. A mirror is a copy of a dataset. A dataset is a set of data. For example, a dataset may be a file system, a volume, a LUN, a sub-volume, etc. In one example, a mirror is established and stored at a remote site. Storing mirror at a remote site increases the likelihood of data recovery in the event of a true disaster that may physically damage the main storage location or its infrastructure (e.g., in the event of flood, power outage, act of war, etc.). The mirror is updated at regular intervals, typically set by an administrator, in an effort to capture the most recent changes to the storage system.

Figure 1:
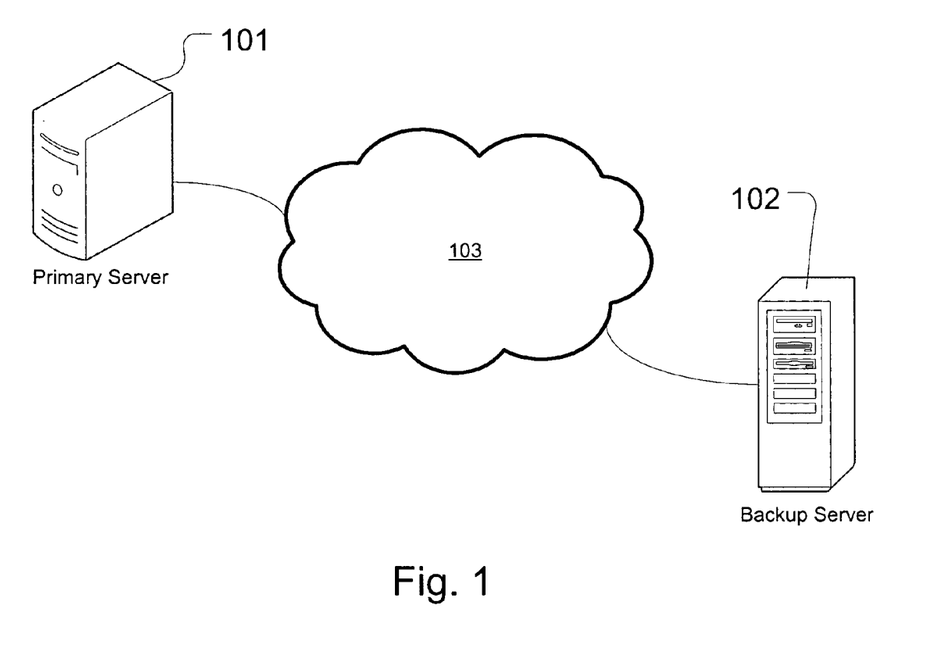
FIG. 1 illustrates a network environment in which a storage server is deployed as a backup server.

As shown in FIG. 1, a storage system 102 may serve as a backup server. A backup server is a processing system configured to store copies of data from other processing systems. A source dataset is a dataset to be backed up. Backing up of a dataset on a primary storage system 101 (hereinafter "primary server") starts with the step of copying the dataset on the primary server 101 to the backup server 102. This initial, or baseline, transfer may take some time to complete, as it is duplicating the entire source dataset to the backup server 102. When the initial full backup is performed, the backup server 102 creates an RPPI of the backup copy of the source dataset. Each subsequent backup transfers those data blocks that have changed since the previous backup process. The backup server 102 receives these data blocks, updates its backup copy, and creates a new RPPI of the backup copy. This backup mechanism is called a block-level incremental backup process. An example of such a backup system is the SnapVault® system provided by Network Appliance.

As described above, RPPI technology provides onsite data protection for a dataset in a storage system. Especially with NetApp's Snapshot technology, a number of RPPIs may be created, yet without consuming too much storage space and time. As used herein, providing continuous data protection (CDP) for a dataset means backing up the dataset whenever any change is made to the dataset. As used herein, providing long-term data protection (LTDP) for a dataset means keeping a backup copy of the dataset available for a sufficiently long period of time. A sufficiently long period of time may be, for example, one year or several years. RPPI technology may provide a method of CDP for a dataset in a storage system.

However, the number of RPPIs a storage server can maintain is limited by design or physical considerations (e.g., available storage space). Thus, in order to ensure the CDP for the dataset, some RPPIs typically need to be deleted. As a result, some historical backups are lost. Therefore, RPPI technology alone does not provide long-term data protection for the dataset.

On the other hand, block-level incremental backup may provide long-term data protection for a dataset in a storage system. The block-level incremental backup technique, however, is not suitable for CDP, because the backup process consumes too many resources, such as time and network bandwidth.

SUMMARY OF THE INVENTION

A system, a method, and a computer program product for providing continuous data protection and long-term data protection of data in a storage system. A persistent point-in-time Image (PPI) image of the data is created and stored at a first storage. The data at the first storage is updated frequently to provide continuous data protection. A copy of the dataset is created and stored in a secondary storage. The copy of the dataset stored in a secondary storage is updated and backed up less frequently than the PPIs image of data stored at the first storage to ensure long-term data protection.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

A method and system for providing Continuous Data Protection (CDP) and Long-Term Data Protection (LTDP) for a dataset in a storage system are described.

According to an embodiment of the present invention, Read-only Persistent Point-in-time Image (RPPIs) of a dataset stored in a primary aggregate of a storage system are created at a particular frequency for providing CDP for the dataset. For example, a particular frequency could be creating one dataset per hour. However, a person of ordinary skill in the art would understand that datasets can be created at the primary aggregate with any frequency. A copy (or mirror) of the dataset is created and stored in a secondary aggregate of the storage system. The copy is updated and backed up less frequently than RPPIs are created to provide LTDP for the dataset.

In one embodiment, the storage system, the primary aggregate, and the secondary aggregate are provided in a single box (a single physical machine, for example). The primary aggregate may be implemented by one or more mass storage devices. The secondary aggregate may be implemented by one or more high capacity mass storage devices. Compared with the mass storage devices implementing the primary aggregate, these high capacity mass storage devices may be relatively slow in performance. One example of a single physical machine implementing the present invention is the StoreVault S500 manufactured by Network Appliance, Inc. of Sunnyvale, Calif.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

Figure 2:
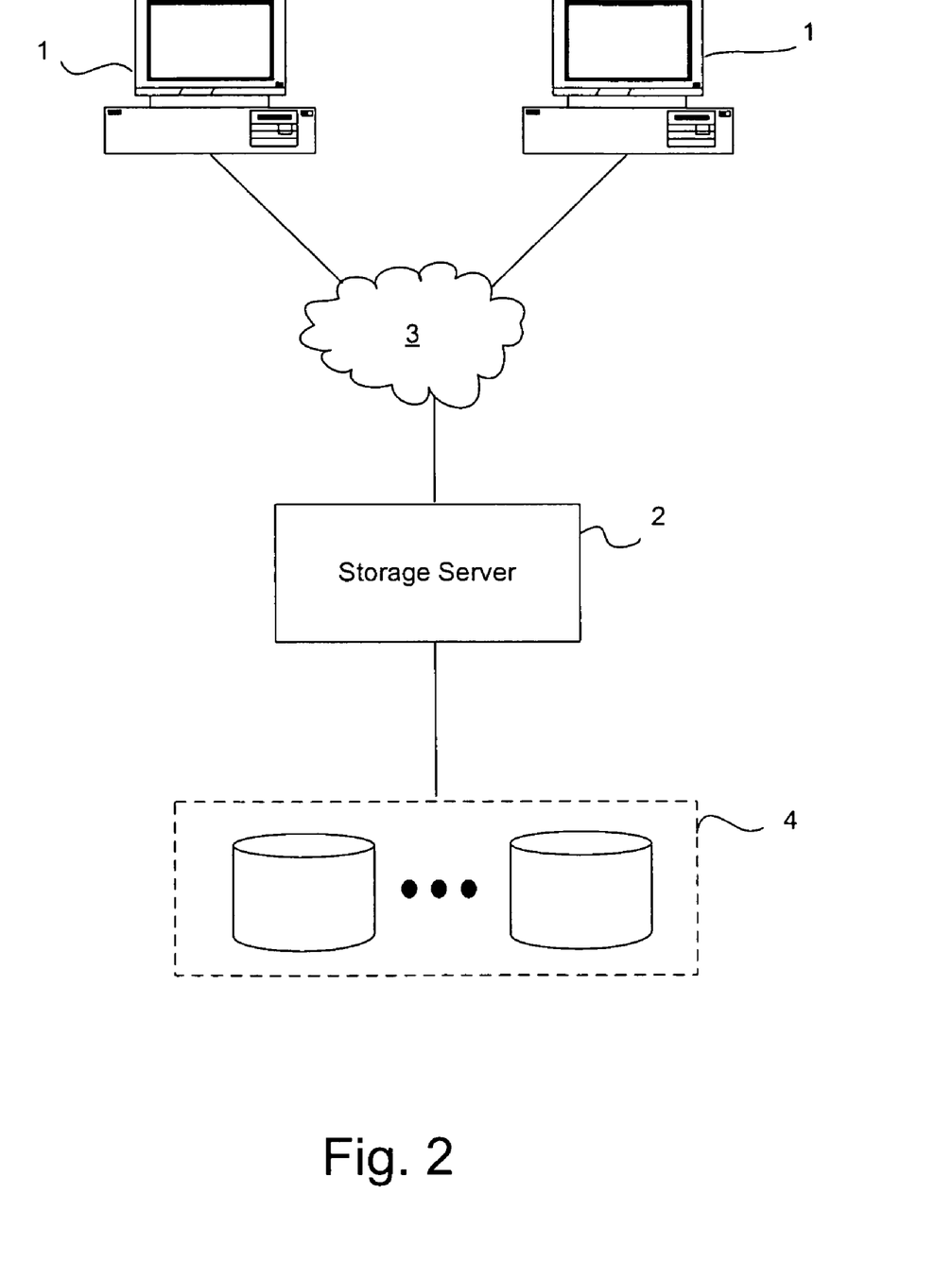
FIG. 2 illustrates a network environment in which the present invention may be implemented.

FIG. 2 illustrates an example of a network environment in which the above-described techniques can be implemented. The network environment of FIG. 2 includes a storage server 2 coupled locally to a storage subsystem 4 that includes a set of mass storage devices. The storage server 2 is also coupled to a set of clients 1 through an interconnect 3. The above-described techniques for creating an RPPI can be implemented in the storage server 2.

The storage server 2 receives various read and write requests from the clients 1 and accesses the storage subsystem 4 to service those requests. Each of the clients 1 may be, for example, a conventional personal computer (PC), workstation, or the like. The mass storage devices in storage subsystem 4 may be, for example, conventional magnetic tapes or disks, optical disks such as CD-ROM or DVD based storage, magneto-optical (MO) storage, or any other type of non-volatile storage devices suitable for storing large quantities of data, or a combination thereof. The storage subsystem 4 may be organized into one or more groups of Redundant Array of Independent Disks (RAID).

The storage server 2 may be, for example, a file server, or a "filer", such as may be used in a NAS environment. Alternatively, the storage server may provide clients with block-level access to stored data, such as in SAN environment. In yet another embodiment, the storage server 2 may be capable of operating in both modes. The storage server 2 can implement one or more of various different protocols, such as a common Internet file system (CIFS), a network file system (NFS), a hypertext transport protocol (HTTP), a simple network management protocol (SNMP), a transfer control protocol/Internet protocol (TCP/IP), etc., and can selectively use these or other appropriate protocols as needed.

In NAS implementation, the interconnect 3 may be any type of computer network, such as a local area network (LAN), a wide area network (WAN), metropolitan area network (MAN) or the Internet. The interconnect 3 may implement the Internet Protocol (IP). In SAN implementation, the interconnect 3 may be, for example, a Fibre Channel switching fabric which implements the Fibre Channel Protocol (FCP) or a LAN using a protocol such as iSCSI.

Figure 3:
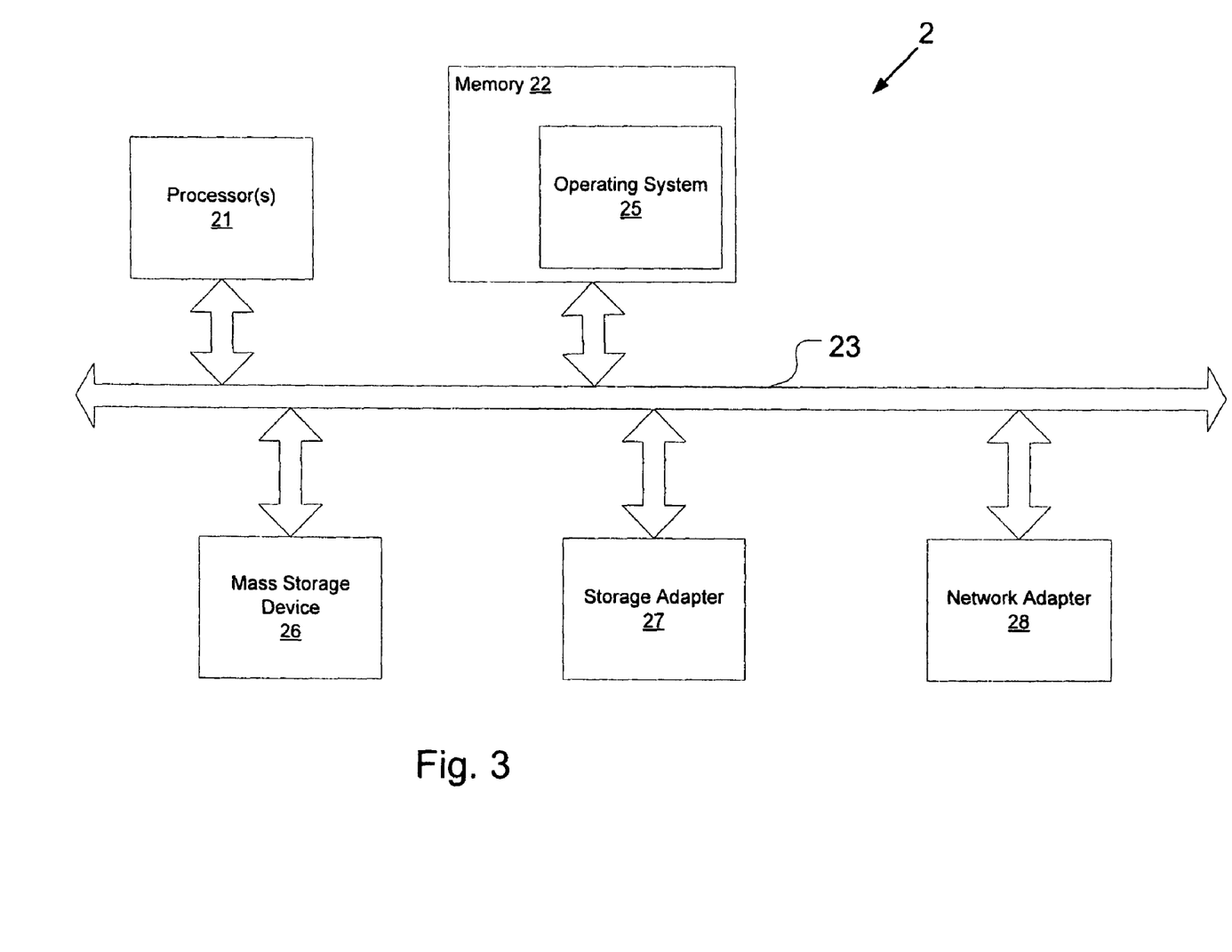
FIG. 3 is a high-level block diagram of a storage server shown in FIG. 2.

FIG. 3 is a high-level block diagram of the storage server 2 shown in FIG. 2, according to various embodiments. Certain standard and well-known components which are not germane to the present invention are not shown. The storage server 2 includes one or more processors 21 coupled to a bus system 23.

The bus system 23 in FIG. 3 can be one or more physical buses. The bus system 23, therefore, may include, for example, a system bus, a Peripheral Component Interconnect (PCI) bus, a HyperTransport (HT) or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 21 are the central processing units (CPUs) of the storage server 2. The processors 21 are configured to control the overall operation of the storage server 2. In certain embodiments, the processors 21 accomplish the overall control of the operation by executing software stored in memory 22. A processor 21 may be, or may include, one or more programmable general-purpose or special-purpose microprocessors, digital signal processors (DSPs), programmable controllers, application specific integrated circuits (ASICs), field-programmable gate arrays (FPGAs), programmable logic devices (PLDs), or the like, or a combination of such devices.

The storage server 2 also includes memory 22 coupled to the bus system 23. The memory 22 represents any form of random access memory (RAM), read-only memory (ROM), flash memory, or a combination thereof. Memory 22 stores, among other components, operating system 25 of the storage server 2, in which the techniques introduced here can be implemented.

Also connected to the processors 21 through the bus system 23 are a mass storage device 26, a storage adapter 27, and a network adapter 28. Mass storage device 26 may include any conventional medium for storing large quantities of data in a non-volatile manner, such as one or more disks. The storage adapter 27 allows the storage server 2 to access the storage subsystem 4. The storage adapter 27 may be, for example, a Fibre Channel adapter, SAS/SATA or a SCSI adapter. The network adapter 28 provides the storage server 2 with the ability to communicate with remote devices such as the clients 1 over a network and may be, for example, an Ethernet adapter or a Fibre Channel adapter.

Memory 22 and mass storage device 26 store software instructions and/or data, which may include instructions and/or data used to implement the techniques introduced here. These instructions and/or data may be implemented as part of the operating system 25 of the storage server 2.

Figure 4:
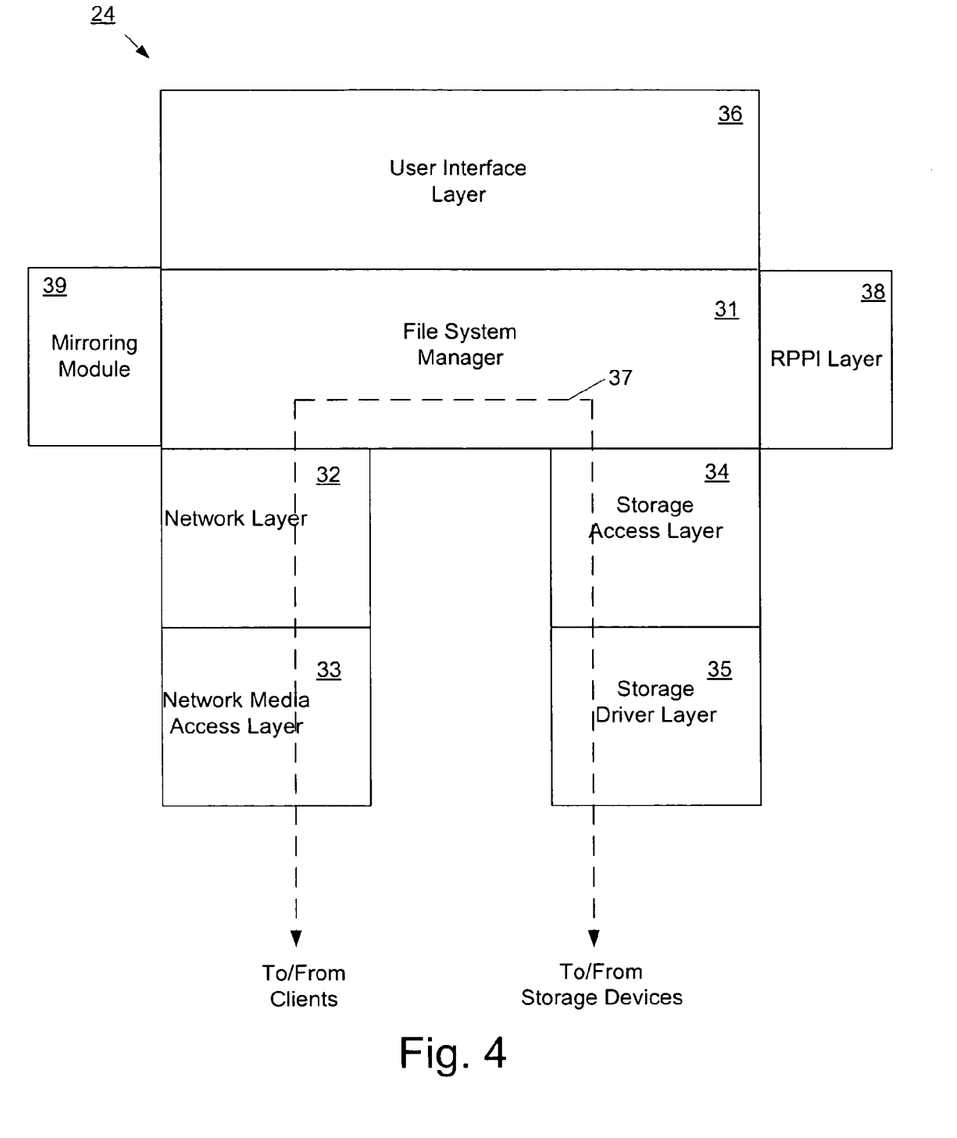
FIG. 4 illustrates operating system of the storage server of FIG. 2.

Referring now to FIG. 4, the operating system 25 of the storage server 2 can include several modules or layers. These modules or layers include a file system manager 31. The file system manager 31 is an application-level programmatic entity which imposes a structure on volumes, files, directories and/or other data containers stored and/or managed by a storage server 2. The file system services read/write requests from clients 1 of the storage server. The structure may be hierarchical or any other kind of structure. In one embodiment, the file system can be WAFL® file system software that is part of the Data ONTAP® storage operating system provided by Network Appliance, Inc. of Sunnyvale, Calif.

Logically under the file system manager 31, the operating system 25 also includes a network layer 32 and an associated network media access layer 33, to allow the storage server 2 to communicate over a network (e.g., with clients 1). The network 32 layer implements various protocols, such as NFS, CIFS, HTTP, SNMP, iSCSI, and TCP/IP. The network media access layer 33 includes one or more drivers, which implement one or more protocols to communicate over the interconnect 3, such as Ethernet, iSCSI or Fibre Channel. Also logically under the file system manager 31, the operating system 25 includes a storage access layer 34 and an associated storage driver layer 35, to allow the storage server 2 to communicate with the storage subsystem 4. The storage access layer 34 implements a storage redundancy protocol, such as RAID-4, RAID-5 or RAID-6. The storage driver layer 35 implements a lower-level storage device access protocol, such as Fibre Channel, iSCSI or SCSI. Reference numeral 37 in FIG. 4 shows the data access path through the operating system 25, associated with servicing read and write requests from clients 1.

The operating system 25 may also include an RPPI layer 38, which interfaces with the file system manager 31 and external RPPI client software, to allow creation of RPPIs and restoration of data from RPPIs. The operating system 25 may further include a user interface layer 36, which implements a graphical user interface (GUI) and/or a command line interface (CLI), for example, such as for purposes of administrative access to the storage server 2. Note that the RPPI layer 38 may be implemented as having an option to create either an RPPI or a PPI.

The operating system 25 may further include a mirroring module 39. The mirroring module 39 is configured to generate mirrors of datasets and manage data backups in accordance with an embodiment of the present invention.

Figure 5:
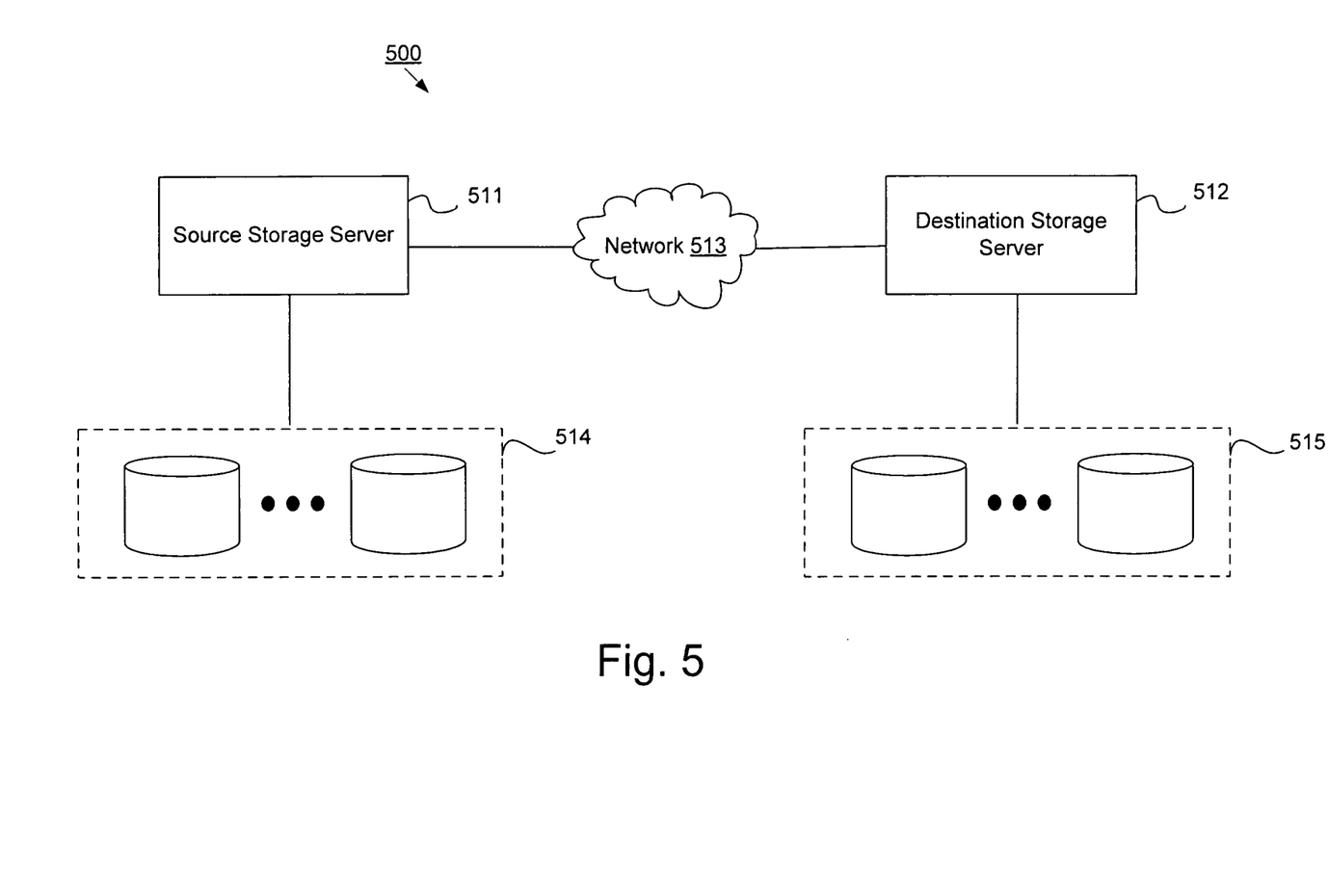
FIG. 5 is a schematic block diagram of a storage system environment that includes a pair of interconnected storage systems including a source storage server and a destination storage server.

Referring now to FIG. 5, is a schematic block diagram of a storage system environment 500 that includes a pair of interconnected storage systems including a source storage server 511 and a destination storage server 512 is shown. As used herein, the term "source" indicates location from which subject data travels during a mirroring operation. "Destination" means location to which the data travels. Each of the source and destination storage servers 511-512 may be a storage server 2 such as the one described in FIG. 2. The source storage server 511 is connected to and has access to a storage subsystem 514. Storage subsystem 514 may be organized into one or more groups of Redundant Array of Independent Disks (RAID).

The destination storage server 512 is connected to and has access to a storage subsystem 515. Storage subsystem 515 may be organized into one or more groups of Redundant Array of Independent Disks (RAID).

The source storage server 512 and destination storage server 514 are linked via a network 513 that may comprise a local or wide area network, such as, for example, the Internet. A person of ordinary skill in the art would understand that a source and destination could be computers or storage systems linked via a direct link, or via loopback. The "loopback" is a "networking" arrangement internal to a single computer for transmitting a data stream between a local source and a local destination). In such a case, the source and the destination are the same storage system.

In an embodiment of the present invention, the mirroring module 39 shown in FIG. 4 controls the mirroring of various datasets between a source and a destination. Incremental changes (i.e., changes since the most recent backup) may be sent from the source to the destination from time to time for data synchronization between the source and the destination. An example of incremental backup mechanism is described in U.S. patent application Ser. No. 10/100,950, which is incorporated herein by reference and which is assigned to Network Appliance, Inc. of Sunnyvale, Calif. According to the mechanism, two RPPIs are generated on a source. One RPPI is utilized to perform initial backup to the destination. This RPPI is called the base RPPI. At some later point in time a second RPPI is generated, which is compared with the base RPPI to generate a set of changes that are transferred to the destination.

Figure 6:
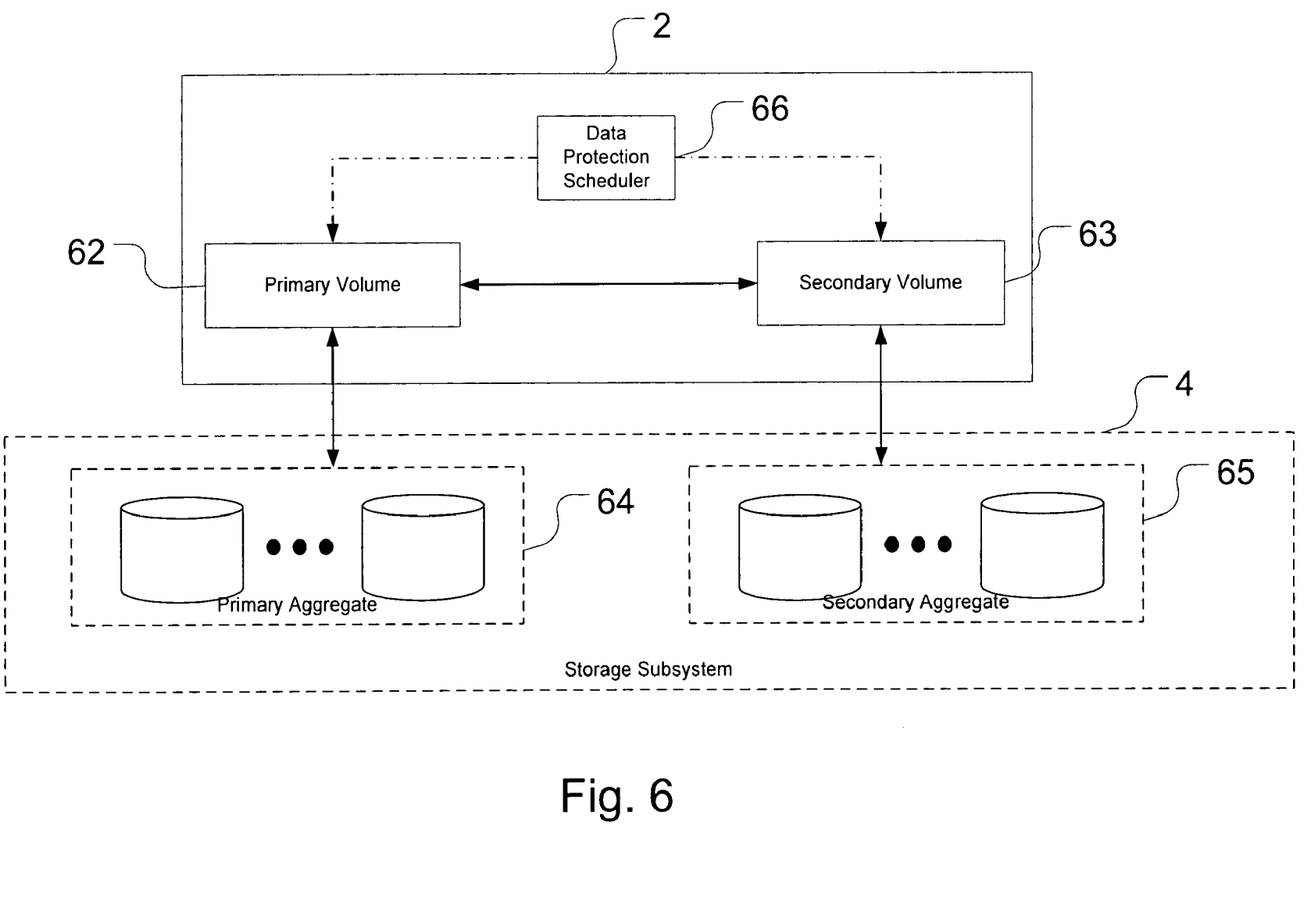
FIG. 6 is a block diagram of a storage server providing continuous data protection (CDP) and long-term data protection (LTDP) for a dataset in the storage server according to an embodiment of the present invention.

FIG. 6 is a block diagram of a storage server providing continuous data protection and long-term data protection for a volume in the storage server 2 according to an embodiment of the present invention. As shown in FIG. 6, a storage server 2 maintains a primary volume 62. To provide continuous data protection for the primary volume 62, RPPIs of the primary volume 62 are created at a high frequency. To provide long-term data protection for the primary volume 62, a secondary volume 63 is created as a mirror for the primary volume 62. The secondary volume 63 is updated to be consistent with the primary volume 62 at a medium frequency. Then, RPPIs of the secondary volume 63 are created at a low frequency. A high frequency could be, for example, one RPPI per hour. A medium frequency could be, for example, once per day. A low frequency could be, for example, one RPPI per month. However, other values for these frequencies are possible. The storage server 2 is coupled to a storage subsystem 4, which has a primary aggregate 64 and a secondary aggregate 65. The primary aggregate 64 maintains the data for the primary volume 62. The secondary aggregate 65 maintains the data for the secondary volume 63. In one embodiment, each of the aggregates 64 and 65 may consist of one or more mass storage devices, such as disks. In one embodiment, the secondary aggregate 65 may consist of high-capacity disks to provide storage for LTDP for the primary volume 62. A high capacity disk is a disk with high storage volume. One example of a high capacity disk is a disk with more than 500 GB. Further, since long-term data protection does not require high frequency backup, speed with which a read-write operation is completed at the secondary aggregate 65 may be much slower than that at the primary aggregate 64 that is providing storage and continuous data protection for the primary volume 62. In one embodiment, high frequency backup means administering backup procedures more than 30 times a day. Thus, the secondary aggregate 65 may be thought of as an additional tier of storage, which is much higher in capacity, but potentially slower in performance compared to the primary aggregate 64. This tier of storage is used to hold data that needs to be kept long term. In an exemplary embodiment, the secondary aggregate 65 may be a compressed aggregate. A compressed aggregate is an aggregate in which data is stored in a compressed mode. In one embodiment, the entire set of data of a volume in the secondary aggregate is compressed. In one implementation, data may be compressed before it is written to a volume. In another embodiment, data may be compressed after it is written to the volume. Various data compression algorithms may be used for purposes of compressing data stored in the secondary aggregate. An example of these compression algorithms is the Lempel-Ziv-Welch, or other suitable compression algorithm.

Yet in another exemplary embodiment, the secondary volume 63 may be a flexible volume. As used herein, a "flexible volume" is a set of stored data associated with one or more mass storage devices and which is managed as an independent administrative unit, such as a single file system, but which is flexibly associated with the underlying physical storage. Flexible volumes allow the boundaries between aggregates and volumes to be flexible. As used herein, the term "flexible" means that there does not have to be a one-to-one relationship between a flexible volume and an aggregate. An aggregate can contain multiple flexible volumes. Hence, flexible volumes can be flexibly associated with the underlying physical storage block characteristics. Further, to help reduce the amount of wasted storage space, any free data block (e.g., data blocks not yet allocated to store data) in an aggregate can be used by any flexible volume in the aggregate. A flexible volume can be grown or shrunk in size. Furthermore, blocks can be committed to flexible volumes on-the-fly from available storage. A flexible volume may be a non-space-guaranteed volume, which means that not every byte of the volume is physically allocated from the underlying aggregate(s). A flexible volume may be created with its size larger than the physical size of the underlying aggregate(s). This situation is called aggregate overcommitment. Aggregate overcommitment provides the type of flexibility that is particularly useful to a storage provider. Using aggregate overcommitment, it may appear that more storage than is actually available from a given aggregate is provided. This arrangement may be useful if a system administrator is asked to provide greater amount of storage than he or she knows will be used immediately. Alternatively, if there are several volumes that sometimes need to grow temporarily, the volumes can share the available space with each other dynamically.

With flexible volume technology, the secondary volume 63 may start small (for example, 100 MB) and the volume may automatically grow depending on the utilization.

Still referring to FIG. 6, a data protection scheduler (DPS) 66 is configured to schedule data protection processes. The DPS 66 may be implemented as part of the operating system 25 shown in FIG. 4, or may be implemented as an application executable by the operating system 25. Typically, the DPS 66 interfaces with the file system manager 31 of the operating system 25 to automatically carry out any scheduled tasks, such as creating RPPIs or backing up a dataset. In one exemplary embodiment, the DPS 66 provides a user interface (not shown in figure) allowing an administrator to configure various parameters, such as the frequency of the backup operation and the time period for keeping backup copies. A person of ordinary skill in the art would understand that this list of parameters is not exhaustive and DPS 66 allows an administrator to configure other parameters to carry out the method of the present invention. For example, the storage server 2 is configured to generate four schedules: the first one is to schedule the creations of RPPIs of the primary volume 62, the second one is to schedule the updates of the secondary volume 63, the third one is to schedule the creations of RPPIs of the secondary volume 63 and the fourth one is to schedule the deletion of RPPIs of the primary volume 62. A person of ordinary skill in the art would understand that any number of schedules can be created. Since creating backup copy of data is desirable to provide CDP, in one embodiment, RPPIs of the primary volume 62 may be created at a frequency of one per minute according to the first schedule. On the other hand, the frequency of updating the secondary volume 63 according to the second schedule may be substantially lower than the frequency used to create RPPIs of the primary volume 62. As used herein, "one frequency is substantially higher than another frequency" means that the ratio between the higher frequency and the lower frequency is greater than 30. One possible frequency with which the secondary volume 63 is updated is, for example, once per hour. Similarly, the frequency of creating RPPIs of the secondary volume 63 may be, for example, one time per month. Because the number of RPPIs a storage server can maintain is limited by design or physical considerations (e.g., available storage space), deletion of some RPPIs of the primary volume 62 ensures continuous data protection for the primary volume 62. In one embodiment, the frequency of deleting RPPIs of the primary volume 62 may be the same as the frequency of creating RPPIs of the primary volume 62, but the deletion may be started after the number of RPPIs created of the primary volume 62 has reached a predetermined threshold. An example of the threshold may be 50 RPPIs. A person or ordinary skill in the art would understand that any number may be used as the predetermined threshold.

Figure 7:
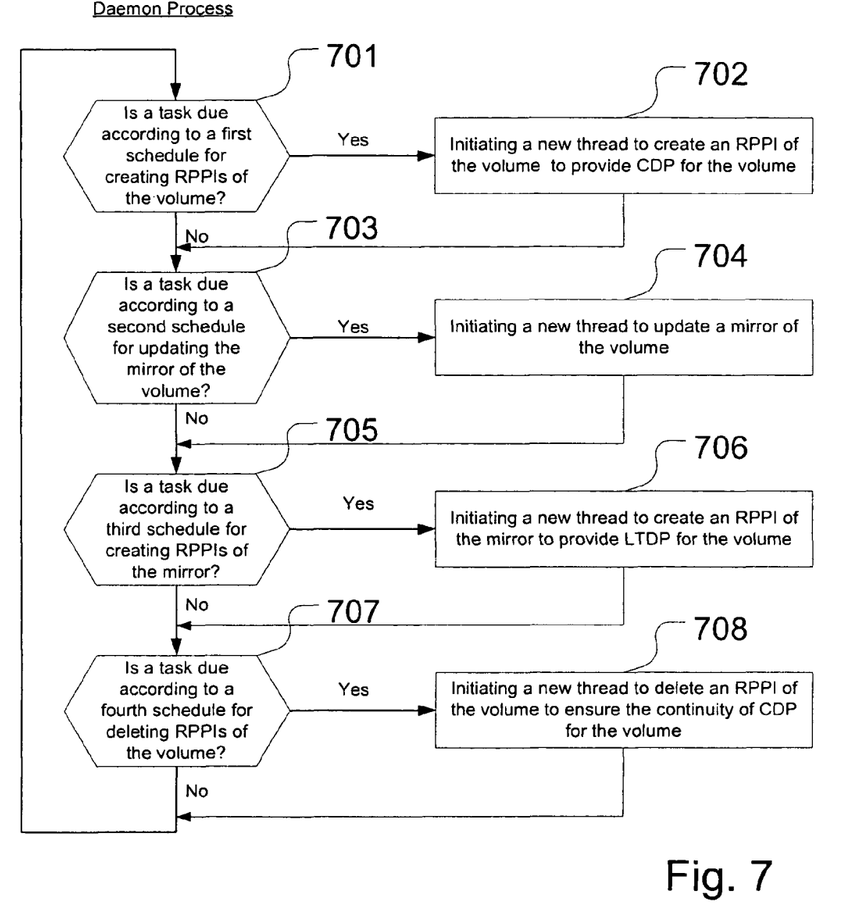
FIG. 7 is a flow diagram illustrating a process of a storage server providing CDP and LTDP for a dataset in the storage server according to an embodiment of the present invention.

FIG. 7 is a flow diagram illustrating a process of providing CDP and LTDP for a volume in the storage server 2 according to an embodiment of the present invention. FIG. 7 is illustrated in view of FIG. 6, wherein it is assumed that a system administrator has already created a mirror for the volume within the same storage system but on a different aggregate. It is also assumed that the administrator has generated four schedules via the DPS 66.

In an embodiment of the present invention, the DPS 66 executes a scheduling daemon (not shown), which is a process initiating tasks scheduled via the DPS 66. The daemon periodically scans the schedules maintained by the DPS 66 and initiates a task when it is due. As shown in FIG. 7, in step 701, the daemon process determines whether a task is due according to a first schedule for creating RPPIs of the primary volume 62. If the task is due according to the first schedule, the daemon process initiates a new thread to handle the task. In step 702, the newly initiated thread creates an RPPI of the primary volume 62 to provide CDP for the primary volume 62. If no task is due according to the first schedule or after the step of 702, the process goes to step 703. In step 703, the daemon process determines whether a task is due according to a second schedule for updating the mirror, which in this case is data residing at the secondary volume 63. If the task is due according to the second schedule, the daemon process initiates a new thread to handle the task. In step 704, the newly initiated thread updates the mirror 63. In one exemplary embodiment, updating the mirror 63 is achieved using a mechanism for incrementally updating data, as described above. If no task is due according to the second schedule or after the step of 704, the process continues to step 705. In step 705, the daemon process determines whether a task is due according to a third schedule for creating RPPIs of the mirror 63. If the task is due according to the third schedule, the daemon process initiates a new thread to handle the task. In step 706, the newly initiated thread creates an RPPI of the mirror 63 to provide LTDP for the primary volume 62. If no task is due according to the third schedule or after the step 706, the process goes to step 707. In step 707, the daemon process determines whether a task is due according to a fourth schedule for deleting RPPIs of the primary volume 62. If so, the daemon process initiates a new thread to handle the task. In step 708, the newly created thread finds an appropriate RPPI of the primary volume 62 and deletes the RPPI to ensure the continuity of CDP for the primary volume 62. If no task is due according to the fourth schedule or after the step 708, the process goes back to step 701.

A person with ordinary skill would appreciate that the above description introduces a storage system that provides both continuous data protection and long-term data protection for data residing on a volume. The same system may also be used for providing CDP and LTDP for any kind of dataset, e.g., a logical unit number (LUN), or a sub-volume such as a qtree. A qtree is a special directory similar to a mini-volume (mini-file system) or a subdivision of a volume that has the property of being able to identify itself within a file system by, e.g., a qtree identifier (qtreeid) stored within metadata portion of a file. Further, the above description uses RPPI as exemplary illustration. The present invention has been described both in the context of a Read-only Persistent Point-in-time Image (RPPI) and a Persistent Point-in-time Image (PPI). An RPPI is a read-only copy, whereas a PPI is both readable and writeable. In one embodiment, instead of creating RPPIs, PPIs may be created for data protection purposes as long as the principle of the invention is followed as described above.

Software to implement the technique introduced here may be stored on a machine-readable medium. A "machine-accessible medium", as the term is used herein, includes any mechanism that provides (i.e., stores and/or transmits) information in a form accessible by a machine (e.g., a computer, network device, personal digital assistant (PDA), manufacturing tool, any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

"Logic", as is used herein, may include, for example, software, hardware and/or combinations of hardware and software.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method for providing data protection, comprising:
   providing, by a network storage system, continuous data protection (CDP) for a dataset in the network storage system by creating persistent point-in-time images (PPIs) of the dataset at a first scheduling frequency, wherein the first scheduling frequency corresponds to an elapsed period of time; and
   providing, by the network storage system, long-term data protection (LTDP) for the dataset by
      maintaining a copy of the dataset in said network storage system,
      updating the copy based on at least one of the PPIs of the dataset at a second scheduling frequency, wherein a first ratio between the first scheduling frequency and the second scheduling frequency is greater than a first threshold value, wherein the first threshold value is based on user input, and
      creating PPIs of the copy at a third scheduling frequency, wherein a second ratio between the second scheduling frequency and the third scheduling frequency is greater than a second threshold value, wherein the second threshold value is based on user input, wherein the first scheduling frequency, the second scheduling frequency, and the third scheduling frequency are different, and wherein the first ratio and the second ratio are different.

2. The method of claim 1, further comprising backing up the dataset upon changes to the dataset to provide CDP.

3. The method of claim 1, further comprising keeping a backup copy of the dataset for a period of time.

4. The method of claim 1, wherein the dataset is maintained on a first aggregate of the network storage system.

5. The method of claim 4, wherein maintaining a copy of the dataset in said network storage system comprises maintaining the copy of the dataset in a second aggregate of said network storage system.

6. The method of claim 1, wherein updating the copy based on at least one of the PPIs of the dataset comprises incrementally updating the copy.

7. The method of claim 1, further comprising limiting the number of PPIs created of the dataset.

8. The method of claim 1, further comprising deleting at least one of the PPIs of the dataset at a fourth scheduling frequency.

9. The method of claim 8, wherein said deleting step is executed only after the number of PPIs of the dataset reaches a specified limit.

10. The method of claim 1, wherein the dataset is a set of data.

11. The method of claim 1, wherein the dataset comprises a volume.

12. The method of claim 1, wherein the dataset comprises a sub-volume.

13. The method of claim 1, wherein the dataset is stored as a plurality of data blocks and each of the PPIs of the dataset includes a reference or references to at least one of the data blocks.

14. The method of claim 1, wherein maintaining a copy of the dataset in said network storage system comprises maintaining the copy of the dataset in said network storage system in a compressed mode.

15. A storage server comprising:
a processor;
a network interface configured to communicate with a client;
a storage interface configured to be used by the client to access at least a first aggregate and a second aggregate, each of the first and second aggregates comprising a mass storage device; and
a memory coupled to the processor, the memory storing instructions which, when executed by the processor, cause the storage server to perform a process comprising:
providing continuous data protection (CDP) for a file system stored in the first aggregate by automatically creating a persistent point-in-time images (PPI) of the file system at a first scheduling frequency, wherein the first scheduling frequency corresponds to an elapsed period of time; and
providing long term data protection (LTDP) for the file system by
creating a mirror of the file system and storing the mirror in the second aggregate,
updating the mirror based on at least one of the PPIs of the file system at a second scheduling frequency, wherein a first ratio between the first scheduling frequency and the second scheduling frequency is greater than a first threshold value, wherein the first threshold value is based on user input, and
creating a PPI of the mirror at a third scheduling frequency, wherein a second ratio between the second scheduling frequency and the third scheduling frequency is greater than a second threshold value, wherein the second threshold value is based on user input, wherein the first scheduling frequency, the second scheduling frequency, and the third scheduling frequency are different, and wherein the first ratio and the second ratio are different.

16. The storage server of claim 15, wherein updating the minor based on at least one of the PPIs of the file system comprises incrementally updating the mirror.

17. The storage server of claim 15, wherein the instructions further cause the storage server to limit the number of PPIs created of the file system.

18. The storage server of claim 17, wherein the process further comprises deleting at least one of the PPIs of the file system at a fourth scheduling frequency.

19. The storage server of claim 15, wherein the file system is stored as a plurality of data blocks and each of the PPIs of the file system includes a reference or references to at least one of the data blocks.

20. The storage server of claim 15, wherein the first scheduling frequency is substantially higher than the second scheduling frequency, and the second scheduling frequency is substantially higher than the third scheduling frequency.

21. The storage server of claim 15, wherein storing the mirror in the second aggregate comprises storing the minor in the second aggregate in a compressed mode.

22. A computing environment comprising:
a storage server configured to provide continuous data protection (CDP) for a file system stored according to one or more schedules and to provide long term data protection (LTDP) for the file system by maintaining a copy of a dataset in a network storage system; and
a data protection scheduler executed at the storage server, configured to maintain schedules for the continuous data protection, wherein the storage server is configured to create persistent point-in-time images (PPIs) of the dataset according to a first schedule, to update the copy of the dataset based on at least one of the PPIs of the dataset according to a second schedule, and to create PPIs of the copy of the dataset according to a third schedule, wherein a first ratio between the first schedule and the second schedule is greater than a first threshold value, and a second ratio between the second schedule and the third schedule is greater than a second threshold value, wherein the first threshold value is based on user input and the second threshold value is based on user input, wherein the first schedule, the second schedule, and the third schedule are different, and wherein the first ratio and the second ratio are different.

23. The environment of claim 22, wherein the storage server is configured to have a first aggregate storing the dataset and a second aggregate storing the copy of the dataset.

24. The environment of claim 22, wherein the first schedule schedules a creation of a PPI of the dataset at a first scheduling frequency, wherein the first scheduling frequency corresponds to an elapsed period of time.

25. The environment of claim 22, wherein the second schedule schedules an update of the copy of the dataset at a second scheduling frequency.

26. The environment of claim 22, wherein the third schedule schedules a creation of a PPI of the copy of the dataset at a third scheduling frequency.

27. A processing system comprising
a processor;
a network interface configured to communicate with a client;
a first aggregate comprising a first mass storage device;
a second aggregate comprising a second mass storage device;
a storage interface configured to be used by the client to access at least the first aggregate and the second aggregate; and
a memory coupled to the processor, the memory storing instructions which, when executed by the processor, cause the processing system to perform a process comprising:
providing continuous data protection (CDP) for a file system stored in the first aggregate by automatically creating a persistent point-in-time images (PPI) of the file system at a first scheduling frequency, wherein the first scheduling frequency corresponds to an elapsed period of time; and
providing long term data protection (LTDP) for the file system by
creating a mirror of the file system and storing the mirror in the second aggregate, updating the mirror based on at least one of the PPIs of the file system at a second scheduling frequency, wherein a ratio between the first scheduling frequency and the second scheduling frequency is greater than a first threshold value, wherein the first threshold value is based on user input, and creating PPIs of the copy at a third scheduling frequency, wherein a ratio between the second scheduling frequency and the third scheduling frequency is greater than a second threshold value, wherein the second threshold value is based on user input, wherein the first scheduling frequency, the second scheduling frequency, and the third scheduling frequency are different, and wherein the first ratio and the second ratio are different.

28. The processing system of claim 27, wherein at least the processor, the first aggregate, the second aggregate and the memory are integrated within a single physical box.

29. The processing system of claim 27, wherein the second mass storage device comprises a high capacity disk.

* * * * *